US006970693B2

(12) United States Patent  
Madour et al.

(10) Patent No.: US 6,970,693 B2  
(45) Date of Patent: Nov. 29, 2005

(54) METHOD, SYSTEM AND TELECOMMUNICATION NODE FOR ALTERNATIVE PREPAID SUPPORT

(75) Inventors: Lila Madour, Kirkland (CA); Stephane Morin, Pierrefonds (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 141 days.

(21) Appl. No.: 10/326,551

(22) Filed: Dec. 23, 2002

(65) Prior Publication Data

US 2004/0048600 A1    Mar. 11, 2004

Related U.S. Application Data

(60) Provisional application No. 60/408,343, filed on Sep. 6, 2002.

(51) Int. Cl.[7] ............................................. H04M 11/00
(52) U.S. Cl. ................. 455/408; 455/432.3; 379/114.2
(58) Field of Search ............................... 455/406, 407, 455/408, 422.1, 432.1, 432.2, 432.3, 433, 455/435.1, 445; 379/111, 114.01, 114.2, 379/144.01; 370/338, 349

(56) References Cited

U.S. PATENT DOCUMENTS

| 6,490,450 | B1 * | 12/2002 | Batni et al. ................. 455/433 |
| 6,684,072 | B1 * | 1/2004 | Anvekar et al. .......... 455/432.1 |
| 6,760,417 | B1 * | 7/2004 | Wallenius ............... 379/114.28 |
| 6,829,473 | B2 * | 12/2004 | Raman et al. ............... 455/406 |
| 2003/0031160 | A1 * | 2/2003 | Gibson et al. ............... 370/349 |
| 2003/0143978 | A1 * | 7/2003 | Cooper et al. ............... 455/406 |
| 2004/0018829 | A1 * | 1/2004 | Raman et al. ............... 455/406 |
| 2004/0019539 | A1 * | 1/2004 | Raman et al. ................. 705/29 |
| 2004/0106393 | A1 * | 6/2004 | Chowdhury et al. ......... 455/406 |

* cited by examiner

Primary Examiner—Binh K. Tieu
(74) Attorney, Agent, or Firm—Alex Nicolaescu; Ericsson Canada Inc.

(57) ABSTRACT

A method and system for providing alternative prepaid service when a serving Packet Data Service Node (PDSN) does not support prepaid or at least the type of prepaid (duration-based or volume-based) the user has subscribed to. The serving PDSN sends an access request to a Home Authorization, Authentication & Accounting Prepaid Server (HAAA/PPS) with an indication of its capability to support prepaid service and to terminate sessions based on requests from remote nodes. When the serving PDSN is neither capable of prepaid service, nor does it support session termination by a remote node, the HAAA/PPS determines that a prepaid session is allowed and supported in combination with a Home Agent (HA) for duration-based prepaid service. When the PDSN is not prepaid capable but supports session termination capability, the HAAA/PPS determines that any type of prepaid service can be allowed and supported by the HAAA/PPS in combination with the HA.

27 Claims, 6 Drawing Sheets

| | PPAC from Serving PDSN (PDSN Capability for Supporting Prepaid) | STC from Serving PDSN (PDSN Support of Remote Session Termination) | Prepaid User Profile from HAAA | Decision for HA-HAAA/PPS Support for Prepaid |
|---|---|---|---|---|
| A | Absent | Present | Volume | YES (Volume) |
| B | Absent | Absent | Volume | No |
| C | Present (duration) | Present | Volume | YES (Volume) |
| D | Present (duration) | Absent | Volume | No (mismatch PDSN Cap. vs user profile) |
| E | Present (volume) | Present | Volume | No (PDSN supports PP) |
| F | Present (volume) | Absent | Volume | No (PDSN supports PP) |
| G | Present (duration, volume) | Present | Volume | No (PDSN supports PP) |
| H | Present (duration, volume) | Absent | Volume | No (PDSN supports PP) |
| I | Absent | Present | Duration | YES (duration) |
| J | Absent | Absent | Duration | YES (duration) |
| K | Present (duration) | Present | Duration | No (PDSN supports PP) |
| L | Present (duration) | Absent | Duration | No (PDSN supports PP) |
| M | Present (volume) | Present | Duration | YES (duration) |
| N | Present (volume) | Absent | Duration | YES (duration) |
| O | Present (duration, volume) | Present | Duration | No (PDSN supports PP) |
| P | Present (duration, volume) | Absent | Duration | No (PDSN supports PP) |

| | PPAC from Serving PDSN (PDSN Capability for Supporting Prepaid) ⌐204 | STC from Serving PDSN (PDSN Support of Remote Session Termination) ⌐206 | Prepaid User Profile from HAAA ⌐208 | Decision for HA-HAAA/PPS Support for Prepaid ⌐300 |
|---|---|---|---|---|
| A | Absent | Present | Volume | YES (Volume) |
| B | Absent | Absent | Volume | No |
| C | Present (duration) | Present | Volume | YES (Volume) |
| D | Present (duration) | Absent | Volume | No (mismatch PDSN Cap. vs user profile) |
| E | Present (volume) | Present | Volume | No (PDSN supports PP) |
| F | Present (volume) | Absent | Volume | No (PDSN supports PP) |
| G | Present (duration, volume) | Present | Volume | No (PDSN supports PP) |
| H | Present (duration, volume) | Absent | Volume | No (PDSN supports PP) |
| I | Absent | Present | Duration | YES (duration) |
| J | Absent | Absent | Duration | YES (duration) |
| K | Present (duration) | Present | Duration | No (PDSN supports PP) |
| L | Present (duration) | Absent | Duration | No (PDSN supports PP) |
| M | Present (volume) | Present | Duration | YES (duration) |
| N | Present (volume) | Absent | Duration | YES (duration) |
| O | Present (duration, volume) | Present | Duration | No (PDSN supports PP) |
| P | Present (duration, volume) | Absent | Duration | No (PDSN supports PP) |

METHOD, SYSTEM AND TELECOMMUNICATION NODE FOR ALTERNATIVE PREPAID SUPPORT

PRIORITY STATEMENT UNDER 35 U.S.C. S.119(e) & 37 C.F.R. S.1.78

This non-provisional patent application claims priority based upon the prior U.S. provisional patent application entitled "PREPAID TUNNELLING FOR MOBILE IP USERS WITH SESSION TERMINATION CAPABILITY NEGOTIATION", application No. 60/408,343, filed Sep. 6, 2002, in the names of Lila MADOUR and Stephane MORIN.

BACKGROUND OF THE INVENTION

1. Field of the Invention

The present invention relates to prepaid support for a mobile user of a telecommunications network.

2. Description of the Related Art

CDMA2000, also known as IMT-CDMA Multi-Carrier or IS-95, is a Code-Division Multiple Access (CDMA) version of the IMT-2000 standard developed by the International Telecommunication Union (ITU). The CDMA2000 standard is a third-generation (3-G) mobile wireless technology allowing mobile users to access IP-based high-speed voice and data traffic over the CDMA-based cellular network. CDMA2000 can support mobile data communications at speeds ranging from 144 Kbps to 2 Mbps.

Figure 1:
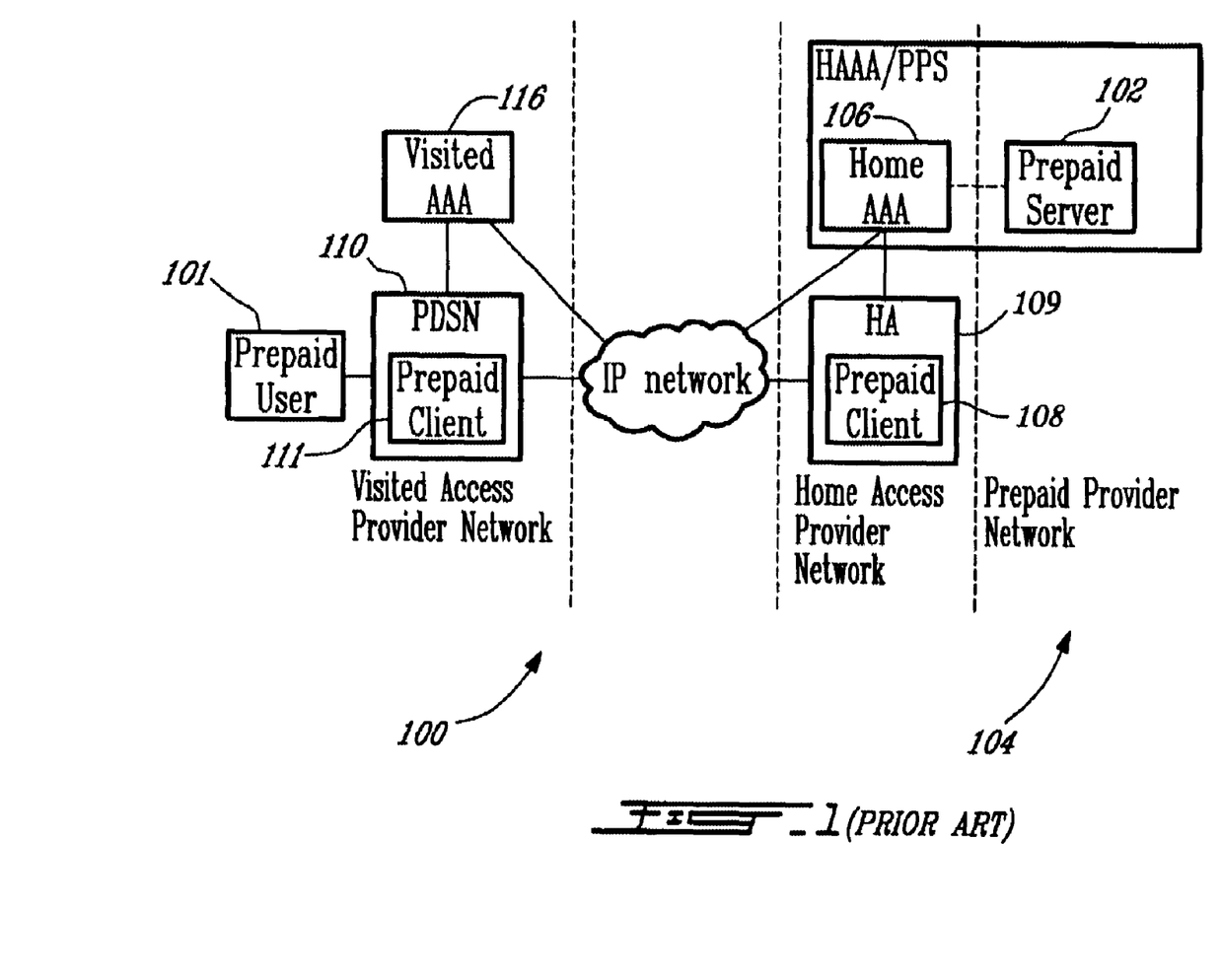
FIG. 1 (Prior Art) is a schematic network diagram of an existing Code Division Multiple Access (CDMA) 2000 wireless IP network.

Reference is now made to FIG. 1 (Prior Art) that shows a high-level block diagram of a CDMA2000 cellular telecommunications network 100. In the CDMA2000 wireless IP network 100, prepaid service allows an end-user 101 to purchase packet data service in advance based on volume or time. The prepaid account status is stored on a Prepaid server (PPS) 102 that is located in the end-user's home network 104 and accessed via a Home Authorization, Authentication & Accounting (HAAA) server 106. A Prepaid Client 108 residing in a Home Agent 109 communicates with the PPS 102 via the HAAA server 106. The function of the Prepaid Client 108 is to perform on-line accounting of the Mobile IP session (i.e.: to allow the Mobile IP traffic according to the granted volume or duration, and to block the Mobile IP traffic if not granted). To provide service to roaming prepaid end-users, a visited PDSN 110 also needs to support a Prepaid Client 111 for performing on-line accounting of the IP session (i.e.: to allow the IP traffic according to the granted volume or duration, and to block the IP traffic if not granted). Accounting messages from the visited PDSN 110 are possibly sent to the Home AAA server 106 via visited AAA server 116, which serves as proxy. The HAAA 106 and the Prepaid server 102 can be collocated in which case the collocated functionality may be denoted HAA/PPS, or could be separate entities. From the PDSN 110 or the HA 108 perspective, the HAAA 106 and the PPS 102 are indistinguishable. The interface between the HAAA 106 and the Prepaid server 102 is outside the scope of the present invention.

When a prepaid user 101 performs Simple IP with authentication or Mobile IP access, the PDSN 110 sends a RADIUS (Remote Authentication Dial In User Service) Access-Request message (not shown) to the HAAA/PPS server for Authentication and Authorization. The PDSN 110 also informs the HAAA/PPS of its own capabilities in supporting Prepaid with on-line accounting, so that proper actions for the support of the prepaid service are taken by the Home AAA 106 or Prepaid server 102 based on those capabilities. In current implementations, the actions taken by the HAAA/PPS server are limited to either participating to the prepaid support provided by the PDSN 110, or denying prepaid support when the PDSN 110 is detected as not supporting the prepaid feature. Usually, the denial of prepaid support implies that the end-user's access is immediately rejected, therefore barring the end-subscriber from using any functions of the wireless IP network.

In summary, in current implementations, a prepaid access request from a prepaid subscriber is rejected as soon as the PDSN is detected as not supporting the prepaid feature. However, this situation results in lost traffic and by consequence in lost revenues for the network operator. There is therefore a need for a solution wherein prepaid sessions can be supported even in absence of PDSN prepaid support. The present invention provides such a solution.

SUMMARY OF THE INVENTION

In one aspect, the present invention is a method for providing alternative prepaid service to a prepaid subscriber, the method comprising the steps of sending an Access Request message from the serving Packet Data Service Node (PDSN) to a Home Authorization, Authentication & Accounting and Prepaid Server (HAAA/PPS), the Access Request message comprising a first indication that the serving PDSN cannot support at least a type of prepaid service; and determining by the HAAA/PPS whether alternative prepaid service is to be provided to the prepaid subscriber using the first indication.

In another aspect, the present invention is CDMA2000 cellular telecommunications system comprising:

a Home Agent (HA) of a prepaid subscriber, the HA being configured for supporting prepaid service;

a serving Packet Data Service Node (PDSN) that cannot support at least a type of prepaid service for the prepaid subscriber;

a Home Authorization, Authentication & Accounting and Prepaid Server functionality (HAAA/PPS) that receives from the serving PDSN an Access Request message comprising a first indication that the serving PDSN cannot support at least a type of prepaid service, and determines whether alternative prepaid service is to be provided to the prepaid subscriber using the first indication.

In yet another aspect, the present invention is an Home Authorization, Authentication & Accounting and Prepaid Server (HAAA/PPS) of a CDMA2000 cellular telecommunications system, comprising:

a Prepaid Policy Decision Service Logic Module (PPD-SLM) receiving from a PrePaid Client a Prepaid Accounting Capability (PPAC) parameter indicative of a capability of a serving Packet Data Service Node (PDSN) to support at least one type of prepaid service, the PPDSLM deciding whether an alternative prepaid service is to be provided to a prepaid subscriber using the PPAC parameter; and a processor for implementing a decision of the PPDSLM regarding a provision of the alternative prepaid service.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

The innovative teachings of the present invention will be described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

The present invention allows for prepaid service to be provided for a prepaid subscriber in cases where the serving Packet Data Service Node (PDSN) of a CDMA2000 cellular telecommunications network does not support the prepaid feature. According to the invention, a combined functionality of a Home Authorization, Authentication & Accounting (HAAA) and a Prepaid Server (PPS), herein referred to as an HAAA/PPS, determines if alternative prepaid service can be provided to a prepaid subscriber by the HAAA/PPS in combination with a Home Agent of the prepaid subscriber, based on an indication received from the serving PDSN. It is to be noted however, that although the functionality of the present invention is mainly described herein with reference to the HAAA/PPS, an HAAA alone, or a PPS alone can also be used for determining in which cases alternative prepaid support is to be provided according to the present invention. Therefore, the terminology of HMA/PPS should be understood to encompass an HAAA alone, a PPS alone, or a combined HAAA/PPS functionality wherein the HAAA and the PPS can be collocated, or not.

According to the exemplary preferred embodiment of the invention, the PDSN signals the HMA/PPS with a PrepaidAccountingCapability (PPAC) parameter indicative of the PDSN's own capacity for supporting prepaid service, and with a Session Termination Capability (STC) parameter indicative of the ability of the serving PDSN to disconnect data sessions based on a request provided by a remote authorized node, such as a Home Agent (HA) or the HAAA/PPS.

In a first case wherein the serving PDSN is neither capable of prepaid service nor does it support session termination by a remote node, the HAAA/PPS may determine that the prepaid session can be allowed for duration-based prepaid service only (volume-based prepaid service can not be provided since neither the serving PDSN nor the HAAA/PPS can monitor the volume quota and terminate the data session when that quota is depleted), and may link the allowed prepaid duration to the mobile station registration lifetime. Thus, the prepaid mobile station's registration lifetime can be used to coordinate the duration quota in order to synchronize the binding lifetime with that duration quota.

According to an alternative embodiment of the invention, it would be also possible to allow volume-based prepaid service in this first case, because the HA of the prepaid subscriber can monitor the traffic, and the data session can be stopped at the HA only, while the serving PDSN continue to perform off-line accounting for IP traffic that is blocked by the HA. In this situation, the HA accounting and PDSN accounting records will not match together. However, the subscriber is a prepaid subscriber and it is the HA that has the PrePaidClient used for the charging, so the Accounting Records from serving PDSN will be dropped. In such a case, the decision for supporting the alternative prepaid service may be based on the PPAC parameter but not on the STC parameter.

In a second case, when the PDSN is not prepaid capable but supports session termination capability by a remote node, the HAAA/PPS may determine that either volume based or duration-based prepaid service can be allowed for the user and supported by the HAAA/PPS in combination with the HA.

Figure 2:
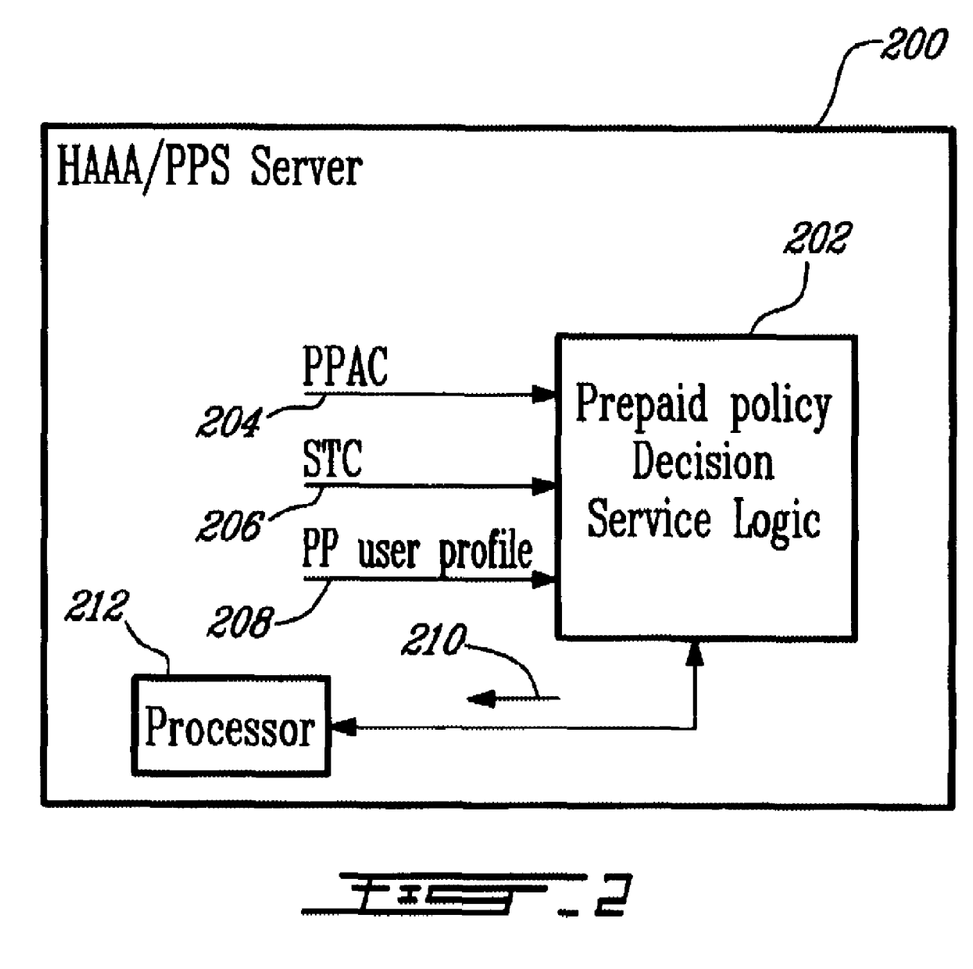
FIG. 2 is an exemplary high-level block diagram of a Home Authorization, Authentication & Accounting Prepaid Server (HAAA/PPS) according to the preferred embodiment of the present invention.

Reference is now made to FIG. 2, which is an exemplary high-level block diagram of a Home Authorization, Authentication & Accounting Prepaid Server (HAAA/PPS) 200 (or alternatively of an HAAA or PPS server) implementing the preferred embodiment of the present invention. The HAAA/PPS server 200 shown in FIG. 2 comprises a prepaid policy decision service logic module 202 that functions to take a decision for supporting alternative prepaid service for a prepaid subscriber, by the Home Agent in combination with the HAAA/PPS, when the serving PDSN cannot provide such a service, or at least the type of prepaid service set in the profile of the prepaid subscriber (a mismatch exist between the type of prepaid service supported by the PDSN and the one the user has subscribed to). For this purpose, the prepaid policy decision service logic module 202 may take into account:

a Prepaid Accounting Capability (PPAC) parameter 204 received from the serving PDSN, which indicates whether or not the serving PDSN is capable of supporting prepaid service. The PPAC parameter 204 may also indicate the type of PDSN-supported prepaid service (duration-based, volume-based, or both). Typically, the absence of the PPAC parameter 204 indicates that the serving PDSN cannot support any type of prepaid service;

a Session Termination Capability (STC) parameter 206 also received from the serving PDSN, the STC parameter 206 being indicative of the capability of the serving PDSN to close data sessions based on a request received from an authorized remote node; and a user prepaid profile 208 of the prepaid user that indicates to which type of prepaid service the user has subscribed to (e.g. duration-based, volume-based, none or both). The user prepaid profile is obtained from the user's Home AAA/PPS or HAAA.

Based on at least the indications provided by the PPAC parameter 204, the STC parameter 206, and the prepaid user profile 208, the prepaid policy decisions service logic module 202 decides whether or not to support alternative prepaid service for a prepaid subscriber, and communicates the decision 210 to a processor 212 of the HAAA/PPS 200, which is then responsible for executing the actions deriving from that decision 210, and which are yet to be described.

Figure 3:
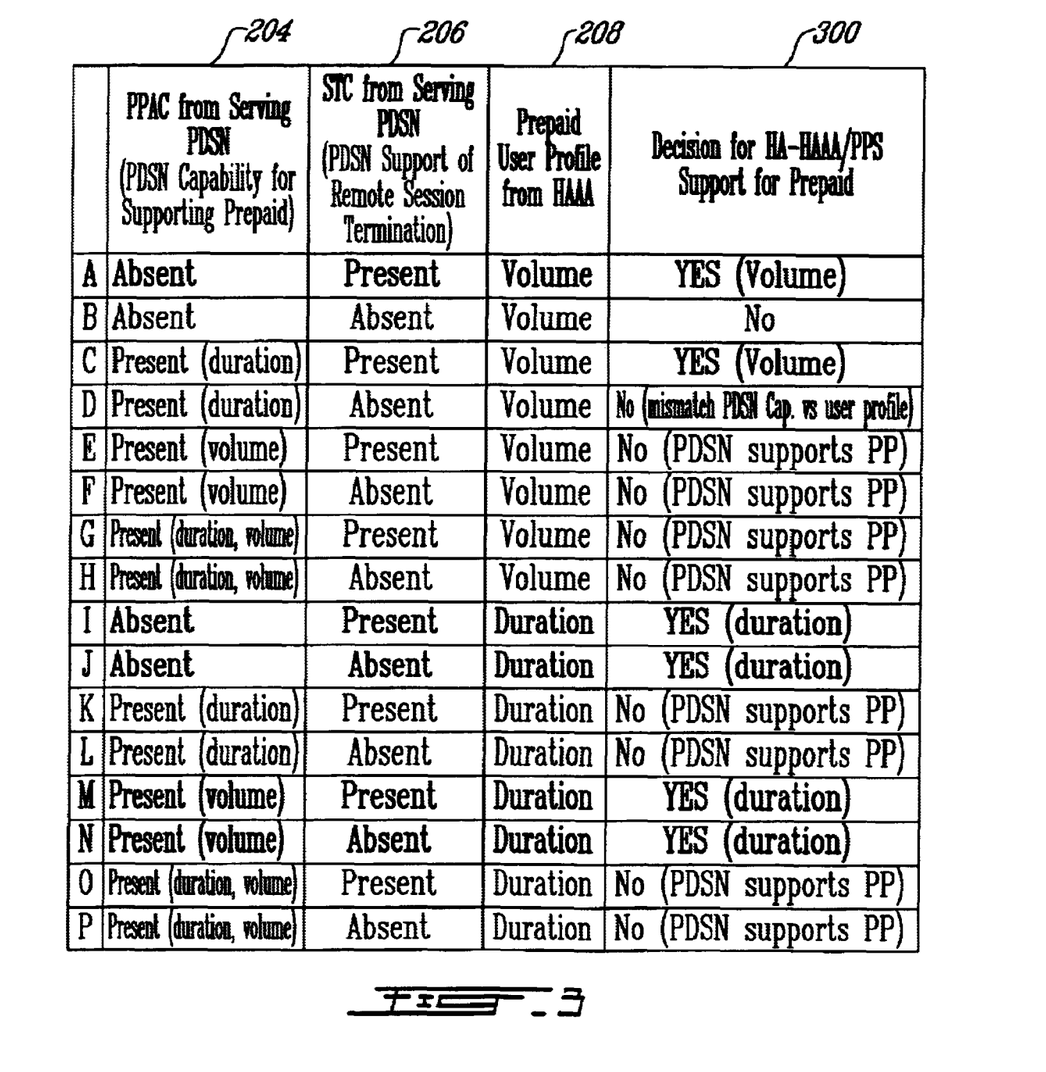
FIG. 3 is an illustration of an exemplary decisional table showing a decisional process of a prepaid policy decision service logic module of the HAAA/PPS server according to the preferred embodiment of the invention.

Reference is now made concurrently to FIG. 2, previously described, and to FIG. 3, which is an illustration of an exemplary decisional table showing an exemplary decisional process of the prepaid policy decision service logic module 202 of the HAAA/PPS server 200 according to the preferred embodiment of the invention. The decisional process shown in table 300 of FIG. 3 is based on the PPAC parameter 204, the STC parameter 206 and the prepaid user profile 208 which are represented in that table.

The first column of the PPAC parameter 204 shows situations wherein the PPAC is either absent, indicating that the serving PDSN cannot support any type of prepaid service, or present, indicating that the serving PDSN can support at least one type of prepaid service (duration-based, volume based or both).

The second column of the STC parameter 206 shows situations wherein the STC is either absent, indicating that the serving PDSN cannot supports remote session termination, or present, which indicates that the serving PDSN supports remote session termination.

Finally, the third column shows the prepaid user profile showing that the user has subscribed to at least one type of prepaid service (duration-based or volume-based). The situations wherein the user profile comprises no prepaid service subscription at all have been omitted from the table 300, since it is understood that in such situations no prepaid service will be provided.

In the exemplary table 300 it is shown that: i) when the serving PDSN is not capable of providing any prepaid service (cases A, I, and J), and ii) when the PDSN is capable of providing one type of prepaid service (e.g. duration-based or volume-based) and a mismatch exist between that prepaid service type and the one set in the prepaid user's profile (cases C, M, and N), the prepaid policy decision service logic module 200 of the HAAA/PPS server 200 decides that prepaid service support is going to be provided for the prepaid user by the HAAA/PPS server 200 in combination with the Home Agent of the prepaid subscriber.

It is to be noted that although the decisional process for supporting the alternative prepaid service for a prepaid subscriber based on the HA and the HAAA/PPS is described in table 300 as being based on the PPAC 204, the STC 206, and the user profile 208 parameters, in a variant of the invention only the PPAC 204, or the PPAC parameter 204 and the user profile information 208 may be used for deciding in which situations the alternative prepaid service is to be provided. For example, alternative prepaid support can be provided independently of the capability of the serving PDSN to support remote session termination as indicated by the STC parameter 206.

Figure 4:
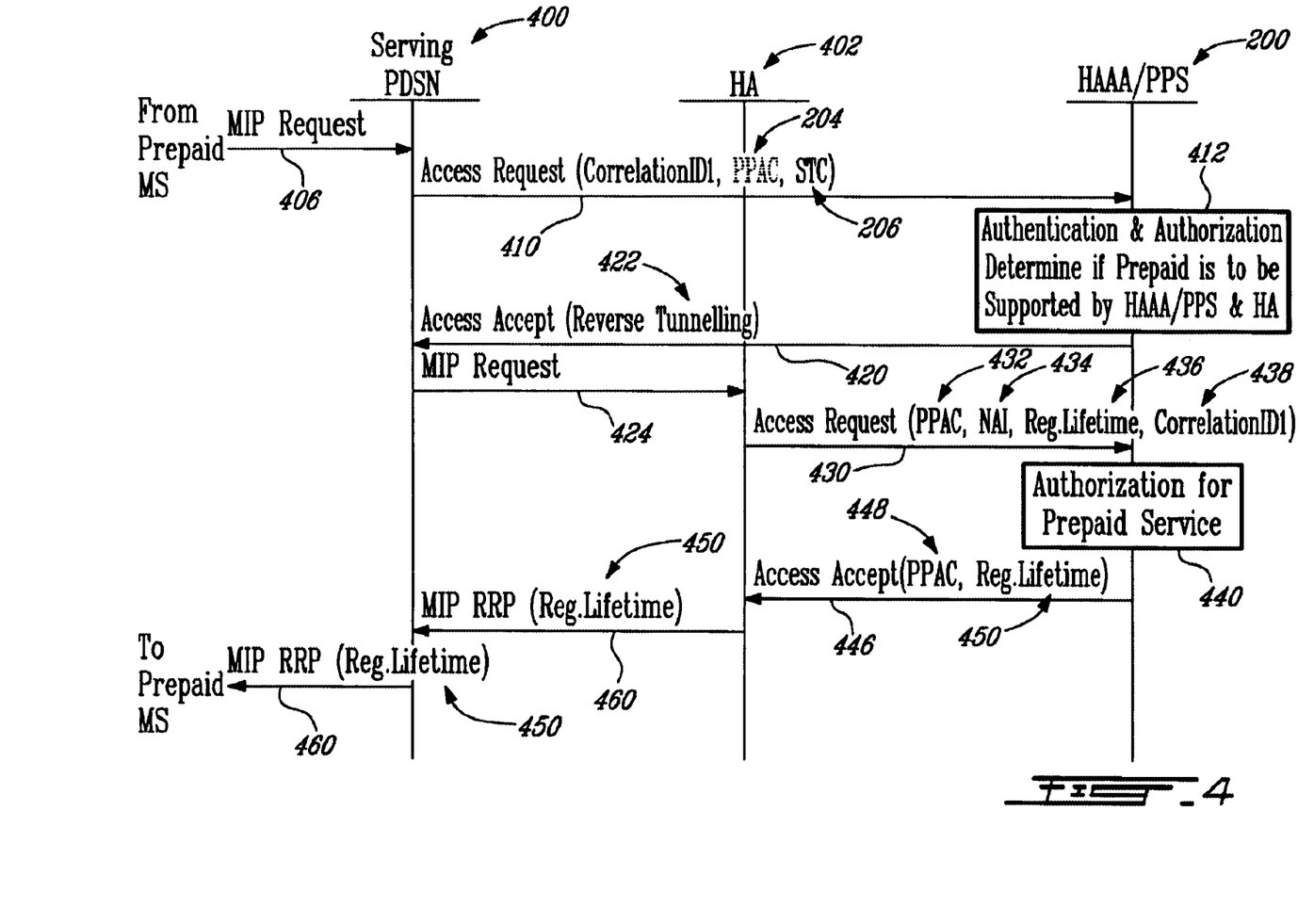
FIG. 4 is an exemplary nodal operation and signal flow diagram showing a prepaid service authorization access according to the preferred embodiment of the present invention.

Reference is now made to FIG. 4, which is an exemplary nodal operation and signal flow diagram showing a mobile station prepaid authorization access according to the preferred embodiment of the present invention. Shown in FIG. 4 is a serving PDSN 400 that serves a prepaid user's mobile station (not shown), a Home Agent (HA) 402 of the prepaid user, and an HAAA/PPS server 200 as described hereinbefore (note that the HAAA/PPS may alternatively be an HAAA server). The serving PDSN 400 receives a Mobile IP (MIP) Registration Request (RRQ) 406 from a prepaid user (not shown), and issues a RADIUS Access Request 410 to the HAAA/PPS 200. In the present scenario, it is assumed that that the PPAC parameter 204 is not included in the Access Request 410 (the absence of the PPAC is shown in dotted lines), and its absence indicates to the HAAA/PPS 200 that the serving PDSN 400 does not support the prepaid service. However, the Access Request 410 includes an STC parameter 206 that indicates that the serving PDSN 400 is capable of terminating data sessions based on requests received from a remote authorized node. In action 412, the HAAA/PPS 200 performs authentication and authorization of the prepaid mobile station, which may include the action described with reference to the prepaid policy decision service logic module 200 of FIGS. 2 and 3, i.e. verifying that the subscriber profile indicates prepaid subscription, checking if the prepaid capability is sent by the serving PDSN 400 (in this exemplary scenario it is not), checking if the STC parameter 206 is included (in the scenario it is), and determining if the HA 402 is also configured to support prepaid service.

The present scenario corresponds to the case I from FIG. 3, i.e. the PPAC parameter 204 is absent, the STC parameter 206 is present, and the user profile indicates a subscription to the duration-based prepaid service. In this situation, the HAAA/PPS 200 may determine that duration-based prepaid service is to be provided for the prepaid user, and therefore may respond to the serving PDSN 400 with an Access Accept message 420 comprising an indication 422 that reverse tunnelling is to be applied. In action 424, the serving PDSN 400 forwards the MIP Registration Request (RRQ) 406 to the HA 402, which is assumed in the present exemplary scenario to be configured for supporting prepaid service. The HA 402 sends an Access Request message 430 to the HAAA/PPS 200, the message 430 comprising a prepaid accounting capability (PPAC) parameter 432 indicative of the capacity of the HA 402 for supporting prepaid service, an identification of the prepaid user mobile station 434, the mobile IP registration lifetime 436, and a correlation identifier 438 to be used by the HAAA/PPS 200 for billing purposes. In action 440, the HAAA/PPS 200 performs an authorization of the request 430 and allows the HA 402 to provide prepaid service for the prepaid user. In action 446, the HAAA/PPS 200 responds back to the HA 402 with an Access Accept response message including a prepaid accounting capability parameter 448 indicative this time of the capability of the HA 402 to support prepaid service for this prepaid user. A new registration lifetime parameter 450 can also be included in the message 446 for providing a new registration lifetime attribute that may be allocated based on the prepaid subscription lifetime and/or other local policy. Finally, in action 460, the HA 402 sends a successful Mobile IP (MIP) Registration Reply (RRP) to the serving PDSN 400, which forwards the message 460 to the prepaid mobile station. If a new registration lifetime parameter 450 is received from the HAAA/BPS 200, it is also included in the MIP RRP message 460 so that the prepaid mobile station is informed of the new registration lifetime.

Figure 5:
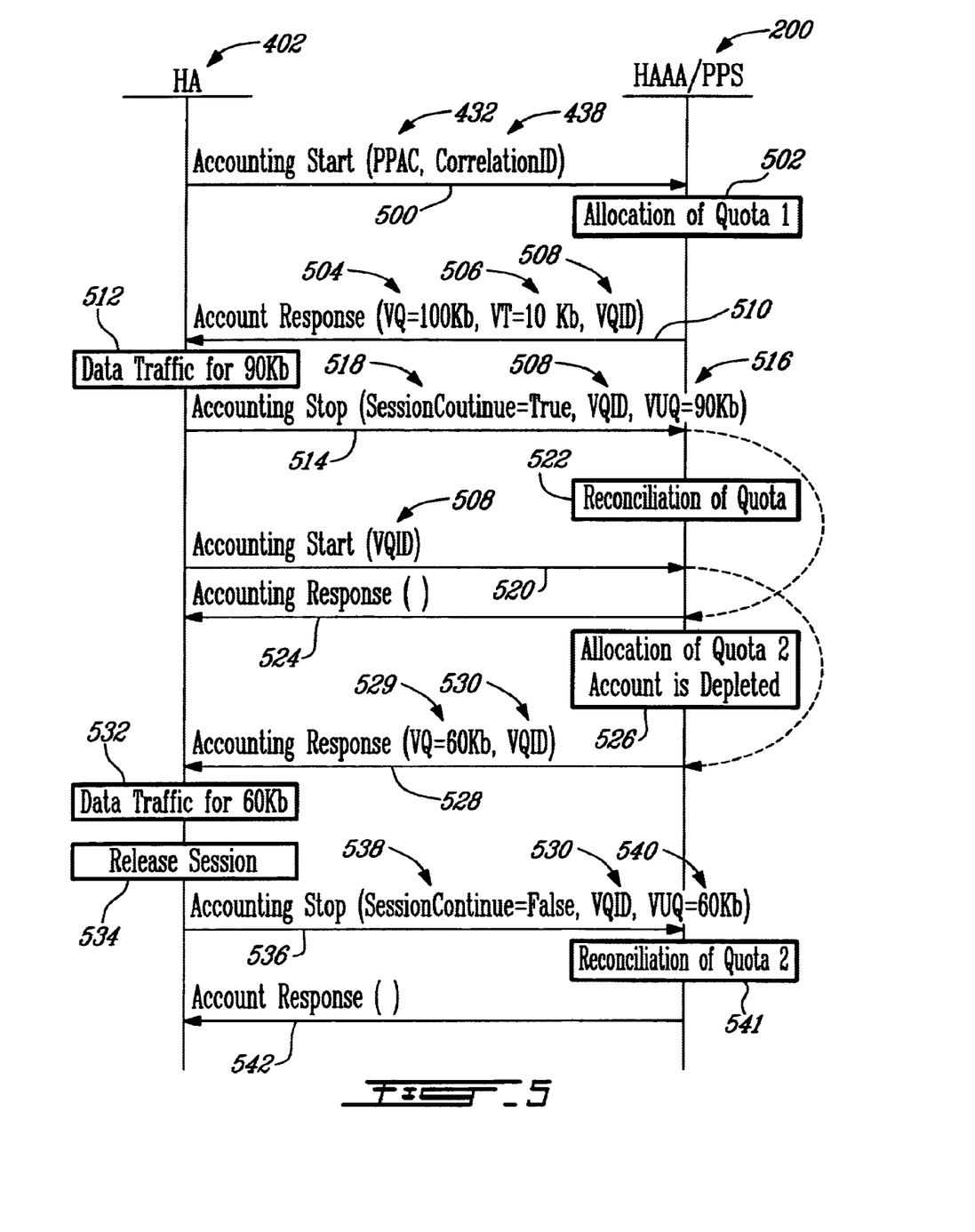
FIG. 5 is an exemplary nodal operation and signal flow diagram showing a prepaid service support by a Home Agent (HA) and the HAAA/PPS server based on data volume usage according to the preferred embodiment of the present invention.

Reference is now made to FIG. 5, which is an exemplary nodal operation and signal flow diagram showing an alternative volume-based prepaid support by the HA 402 and the HAAA/PPS 200 according to the preferred embodiment of the present invention. When the prepaid user (not shown) has been successfully authenticated and authorized, as described with relation to FIG. 4, an accounting session can be initiated in the HA 402, which maintains the prepaid IP session until either the allocated resources have been completely exhausted, the end-user terminates the prepaid IP session, or mobile IP timeout occurs and re-registration has not been received. Prepaid quotas are allocated and maintained in the HAAA/PPS 200 for the MIP session initiated by the prepaid user. The present scenario presents a successful case where user accounting is performed until the allocated volume quota is completely depleted. It is assumed that the prepaid subscriber originally has an exemplary allocated quota of 150 kb of volume usage.

With reference to FIG. 5, in action 500 the HA 402 sends a RADIUS Accounting Start message to the HAAA/PPS 200, the message comprising the correlation identifier 438 and the prepaid capability 432. In action 502, HAAA/PPS 200 may allocate, for example, a first Volume Quota (VQ) 504 of 100 kb, choose a Volume quota Threshold (VT) 506 of 10 kb indicative of when to request a new volume allocation, and creates a Volume Quota Identifier (VQID) 508 for the VQ 504. In action 510, the HAAA/PPS 200 returns to the HA 402 an Account Response message comprising the VQ 504, the VT 506 and the VQID 508. In action 512, the HA 402 allows data traffic to and from the prepaid user for an amount of 90 kb (via the serving PDSN which is not shown in FIG. 5). Once the 90 kb has been reached (corresponding to 10 kb of unused as indicated by the VT 506), the HA 402 sends a RADIUS Accounting Request Stop message 514 to the HAAA/PPS 200, the message 514 comprising a prepaid Volume of Used Quota (VUQ) 516 that indicates the data volume already used from the total allocated quota, the prepaid VQID 508, an indication 518 that the session is still active (SessionContinue=TRUE). The HA 402 also sends a RADIUS Accounting Request Start message 520 to the HAAA/PPS 200 indicating that a new accounting session has started, wherein the message 520 includes the same VQID 508. In the meantime, the HAAA/PPS 200 continues to count the data traffic, up to the maximum limit specified by the VQ 504, while waiting for the RADIUS Accounting Response Start message 520. Based on the information received in the message 514, in action 522 the HAAA/PPS 200 reconciliates the user's quota, and returns to the HA 402 an empty RADIUS Accounting Response message 524. The HAAA/PPS 200 allocates a new volume quota 529 of 60 kb identified by a new quota identifier 530, which completely depletes the user account, action 526. Then, it returns to the HA 402 the new VQ 529 with the new VQID 530 in a RADIUS Accounting Response Start message 528. The absence of a VT parameter in the message 528 indicates that the last possible quota allocation has been performed and therefore that the data session shall be released by the HA 402 when the VQ is completely used. In action 532, the HA 402 allows data traffic to be exchanged for the prepaid user until the final VQ is reached, and at that point releases the MIP data session, action 534. The HA 402 sends the VQID 530, an indication 538 that the data session is terminated, and the latest VUQ 540 to the HAAA/PPS 200 in the final RADIUS Accounting Request Stop message 536. Finally, the HAAA/PPS 200 reconciliates the user's quota, action 541, using the information received in the message 536, and returns an empty RADIUS Accounting Response message 542 to the HA 402.

Figure 6:
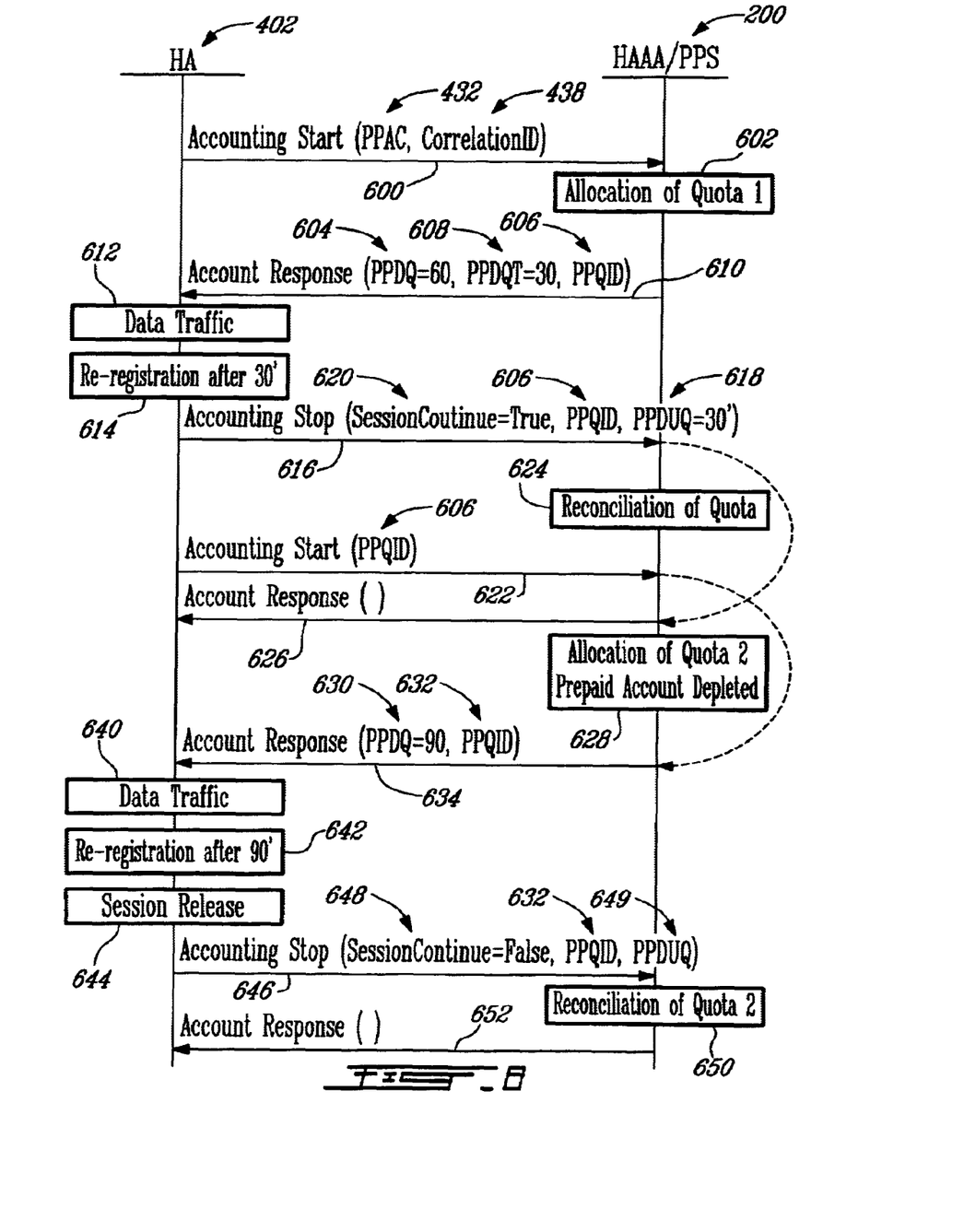
FIG. 6 is an exemplary nodal operation and signal flow diagram showing a prepaid support by the Home Agent (HA) and the HAAA/PPS server based on duration usage according to the preferred embodiment of the present invention.

Reference is now made to FIG. 6, which is an exemplary nodal operation and signal flow diagram showing an alternative duration-based prepaid support by the HA 402 and the HAAA/PPS 200, previously described, according to the preferred embodiment of the present invention. When the prepaid user (not shown) has been successfully authenticated and authorized, as described with relation to FIG. 4, an accounting session can be initiated in the HA 402, which maintains the prepaid IP session until either the allocated duration resources have been completely exhausted or the end-user terminates the prepaid IP session. An exemplary duration prepaid quota of 120 minutes is allocated in the present scenario and is maintained in the HAAA/PPS 200 for the MIP session initiated by the prepaid user. The present scenario presents a successful case where user accounting is performed until the complete duration of 120 minutes is depleted from the user's account.

With reference to FIG. 6, in action 600 the HA 402 sends a RADIUS Accounting Start message to the HAAA/PPS 200, the message comprising the correlation identifier 438 and the prepaid capability 432. In action 602, the HAAA/PPS 200 may allocate a first Prepaid Duration Quota (PPDQ) 604 of 60 minutes of usage identified by a Prepaid Quota Identifier (PPQID) 606, and a Prepaid Duration Quota Threshold (PPDQT) 608 set to, for example, to 30 minutes.

According to a variant of the preferred embodiment of the invention, the PPDQ 604 may be set to a multiple of the registration lifetime. For example, if the registration lifetime is 30 minutes, the PPDQ 604 may be set to 60 minutes.

In action 610, the HAAA/PPS 200 returns to the HA 402 an Accounting Response message 610 with the PPDQ 604, the PPQID 606, and the PPDQT 608. In action 612, the HA 402 allows traffic to be performed to and from the prepaid user for a duration of 30 minutes. At that time, an MIP re-registration is performed at the HA 402 by the MIP user mobile station (not shown), action 614, and the HA 402 determines if the re-registration is to be allowed based on the original PPDQ 604. In the present case, the re-registration is allowed since the prepaid duration account has not been depleted. The HA 402 sends to the HAAA/PPS 200 a RADIUS Accounting Stop message 616 comprising a Prepaid Duration of Used Quota (PPDUQ) 618 showing the duration of 30 minutes that is already used by the prepaid user, the PPQID 606, and an indication 620 that the session continues (SessionContinues=TRUE). Immediately afterwards, the HA 402 also sends a RADIUS Accounting Request Start message 622 indicating that a new accounting session is started, the message 622 including the same PPQID 606. In action 624, the HAAA/PPS 200 reconciliates the user's quota using the information received in message 616, and returns to the HA 402 an empty RADIUS Accounting Request Stop message 626.

In action 628, the HAAA/PPS 200 allocates a new duration quota 630 of, for example 90 minutes, with a new PPQID 632, which completely depletes the prepaid user's account, and returns the new PPDO 630 and the new PPQID 632 via RADIUS Account Response message 634 to the HA 402. The HA 402 allows traffic to and from the user, action 640, until the final duration quota of 90 minutes is reached. When the complete quota is depleted, the HA 402 receives a new MIP re-registration request from the user's mobile station, action 642. At this time, the HA 402 indicates the failure in the registration reply because the entire available duration quota is already depleted. Therefore, the HA 402 releases the MIP data session, action 644, and sends a RADIUS Accounting Stop message 646 with an indication 648 that a data session is terminated, the PPOID 632 and a PPDUQ 649. In action 650, the HAAA/PPS 200 reconciliates the user's quota using the information received in the message 642, and returns an empty RADIUS Accounting Response message 652 to the HA 402.

Based upon the foregoing, it should now be apparent to those of ordinary skill in the art that the present invention provides an advantageous solution, which provides for prepaid service even in cases wherein the serving PDSN is incapable of supporting such service. Although the system and method of the present invention have been described in particular reference to certain exemplary actions for carrying out the invented concept, it should be realized upon reference hereto that the innovative teachings contained herein are not necessarily limited thereto, and may be implemented advantageously using different steps. For example, although the exemplary preferred embodiment of the invention has been described with reference being primarily made to the HAAA/PPS, it is understood that a standalone HAAA or a PPS, or any other type of node herein designated by the generic term HAAA/PPS, can be used for carrying out the invention. Furthermore, although FIGS. 5 and 6 describe exemplary prepaid signaling, it is understood that other types of signaling may exist for provisioning prepaid service between the HAAA/PPS and the HA, such as for example using Account Interim messages instead of Accounting Start and Accounting Stop message, as described hereinbefore. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for providing alternative prepaid service to a prepaid subscriber, the method comprising the steps of:
   receiving an Access Request message sent from a serving Packet Data Service Node (PDSN) to a Home Authorization, Authentication & Accounting Prepaid Server (HAAA/PPS), the Access Request message comprising:
      a first indication that the serving PDSN cannot support at least a type of prepaid service; and
      a second indication indicative of a capability of the serving PDSN to terminate data sessions based on requests from authorized remote nodes; and
   using the first indication and the second indication, determining by the HAAA/PPS whether alternative prepaid service is to be provided to the prepaid subscriber by a Home Agent of the prepaid subscriber in combination with the HAAA/PPS.

2. The method claimed in claim 1, wherein the first indication is a Prepaid Accounting Capability (PPAC) parameter and the second indication is a Session Termination Capability (STC) parameter.

3. The method claimed in claim 2, wherein the step of determining comprises the step of:
   determining by the HAAA/PPS whether alternative prepaid service is to be provided to the prepaid subscriber based using the PPAC parameter, the STC parameter, and a prepaid subscriber profile information.

4. The method claimed in claim 3, wherein the HAAA/PPS determines that alternative prepaid service is to be provided to the prepaid subscriber when the PPAC parameter indicates that the serving PDSN is not capable of providing at least one type of prepaid service.

5. The method claimed in claim 4, wherein the at least one type of prepaid service comprises a volume-based prepaid service.

6. The method claimed in claim 4, wherein the at least one type of prepaid service comprises a duration-based prepaid service.

7. The method claimed in claim 3, wherein the HAAA/PPS determines that alternative prepaid service is to be provided to the prepaid subscriber when the PPAC parameter indicates that the serving PDSN is not capable of providing prepaid service of a type comprised in the prepaid subscriber profile information.

8. The method claimed in claim 1, further comprising the step of:
   receiving by the serving PDSN a Mobile IP (MIP) Request from the prepaid subscriber;
   wherein the Access Request message is sent from the serving PDSN to the HAAA/PPS responsive to the receipt of the MIP Request by the serving PDSN.

9. The method claimed in claim 8, further comprising the step of:
   providing the alternative prepaid service for the prepaid subscriber by the HAAA/PPS in combination with a Home Agent (HA) of the prepaid subscriber.

10. A CDMA2000 cellular telecommunications system comprising:
    a Home Agent (HA) of a prepaid subscriber, the HA being configured, for supporting prepaid service;
    a serving Packet Data Service Node (PDSN) that cannot support at least a type of prepaid service for the prepaid subscriber; and
    a Home Authorization, Authentication & Accounting Prepaid Server functionality (HAAA/PPS) that receives from the serving PDSN an Access Request message comprising a first indication that the serving PDSN cannot support at least a type of prepaid service, and a second indication indicative of a capability of the serving PDSN to terminate data sessions based on requests from authorized remote nodes, and determines whether alternative prepaid service is to be provided to the prepaid subscriber using the first indication and the second indication.

11. The system claimed in claim 10, wherein the first indication is a Prepaid Client Capability (PPAC) parameter and the second indication is a Session Termination Capability (STC) parameter.

12. The system claimed in claim 11, wherein the HAAA/PPS determines whether alternative prepaid service is to be provided to the prepaid subscriber using the PPAC parameter, the STC parameter, and a prepaid subscriber profile information.

13. The system claimed in claim 12, wherein the HAAA/PPS determines that alternative prepaid service is to be provided to the prepaid subscriber when the PPAC parameter indicates that the serving PDSN is not capable of providing at least one type of prepaid service.

14. The system claimed in claim 13, wherein the at least one type of prepaid service comprises a volume-based prepaid service.

15. The system claimed in claim 13, wherein the at least one type of prepaid service comprises a duration-based prepaid service.

16. The system claimed in claim 12, wherein the HAAA/PPS determines that alternative prepaid service is to be provided to the prepaid subscriber when the PPAC parameter indicates that the serving PDSN is not capable of providing prepaid service of a type comprised in the prepaid subscriber profile information.

17. The system claimed in claim 10, wherein the serving PDSN receives a Mobile IP (MIP) Request from the prepaid subscriber and sends the Access Request message to the HAAA/PPS responsive to a receipt of the MIP Request by the serving PDSN.

18. The system claimed in claim 17, wherein after determining whether alternative prepaid service is to be provided for the prepaid subscriber, the HAAA/PPS and the HA provide the alternative prepaid service for the prepaid subscriber.

19. A Home Authorization, Authentication & Accounting Prepaid Server (HAAA/PPS) of a CDMA2000 cellular telecommunications system, comprising:
  a Prepaid Policy Decision Service Logic Module (PPDSLM) receiving a Prepaid Client Capability (PPAC) parameter indicative of a capability of a serving Packet Data Service Node (PDSN) to support at least one type of prepaid service, and a Session Termination Capability (STC) parameter indicative of a capability of the serving PDSN to terminate data sessions based on requests from authorized remote nodes, the PPDSLM deciding whether an alternative prepaid service is to be provided to a prepaid subscriber using the PPAC parameter and the STC parameter; and
  a processor for implementing a decision of the PPDSLM regarding a provision of the alternative prepaid service.

20. The HAAA/PPS claimed in claim 19, wherein the PPDSLM further receives a prepaid user profile information, wherein the PPDSLM decides whether an alternative prepaid service is to be provided using the PPAC parameter, the STC parameter and the prepaid user profile information.

21. The HAAA/PPS claimed in claim 20, wherein the HAAA/PPS is a Home Authorization, Authentication & Accounting (HAAA).

22. The HAAA/PPS claimed in claim 20, wherein the HAAA/PPS is a Prepaid Server (PPS).

23. The HAAA/PPS claimed in claim 21, wherein the PPDSLM determines that alternative prepaid service is to be provided to the prepaid subscriber when the PPAC parameter indicates that the serving PDSN is not capable of providing at least one type of prepaid service.

24. The HAAA/PPS claimed in claim 23, wherein the at least one type of prepaid service comprises a volume-based prepaid service.

25. The HAAA/PPS claimed in claim 23, wherein the at least one type of prepaid service comprises a duration-based prepaid service.

26. The HAAA/PPS claimed in claim 21, wherein the PPDSLM determines that alternative prepaid service is to be provided to the prepaid subscriber when the PPAC parameter indicates that the serving PDSN is not capable of providing prepaid service of a type comprised in the prepaid subscriber profile information.

27. The HAAA/PPS claimed in claim 26, wherein after the PPDSLM determines whether alternative prepaid service is to be provided for the prepaid subscriber, the HAAA/PPS provides the alternative prepaid service for the prepaid subscriber in cooperation with a Home Agent (HA) of the prepaid subscriber.

* * * * *

UNITED STATES PATENT AND TRADEMARK OFFICE
CERTIFICATE OF CORRECTION

PATENT NO.         : 6,970,693 B2                                      Page 1 of 1
APPLICATION NO. : 10/326551
DATED               : November 29, 2005
INVENTOR(S)       : Lila Madour et al.

It is certified that error appears in the above-identified patent and that said Letters Patent is hereby corrected as shown below:

In Column 1, Line 54, delete "HAA/PPS" and insert -- HAAA/PPS --, therefor.

In Column 3, Line 59, delete "HMA/PPS" and insert -- HAAA/PPS --, therefor.

In Column 3, Line 64, delete "HMA/PPS" and insert -- HAAA/PPS --, therefor.

In Column 8, Line 52, delete "PPDO" and insert -- PPDQ --, therefor.

In Column 8, Line 63, delete "PPOID" and insert -- PPQID --, therefor.

In Column 9, Line 65, in Claim 3, after "and" delete "a".

In Column 10, Line 53, in Claim 12, after "and" delete "a".

Signed and Sealed this

Twenty-seventh Day of November, 2007

JON W. DUDAS
*Director of the United States Patent and Trademark Office*